United States Patent [19]
Barbot et al.

[11] Patent Number: 5,749,318
[45] Date of Patent: May 12, 1998

[54] SELF-CLEANING LITTER BOX FOR ANIMALS

[76] Inventors: Gérard Barbot, 254 Boulevard Voltaire, Paris, France, F-75011; Cyril Rameau, 9, Grande-rue, Maule, France, F-78580; Patrick F. Sanchez, 141, rue Paul et Camille-Thomoux, Neuilly sur Marne, France, F-93330

[21] Appl. No.: 595,879

[22] Filed: Feb. 6, 1996

Related U.S. Application Data

[63] Continuation of PCT/FR94/00988, Aug. 5, 1994.

[30] Foreign Application Priority Data

Aug. 6, 1993 [FR] France .................. 03/09707

[51] Int. Cl.⁶ ........................................ A01K 1/035
[52] U.S. Cl. ............................ 119/166; 119/163
[58] Field of Search ................... 119/163, 166; 209/235, 247, 260

[56] References Cited

U.S. PATENT DOCUMENTS

| | | | |
|---|---|---|---|
| 4,465,018 | 8/1984 | Mopper | 119/166 |
| 4,493,288 | 1/1985 | Van Der Kolk | 119/166 X |
| 5,267,530 | 12/1993 | Zamoyski | 119/166 |
| 5,279,258 | 1/1994 | Kakuta | 119/163 X |
| 5,511,513 | 4/1996 | Baron et al. | 119/163 |

FOREIGN PATENT DOCUMENTS 2648313  12/1990  France .

*Primary Examiner*—Robert P. Swiatek
*Assistant Examiner*—Elizabeth Shaw
*Attorney, Agent, or Firm*—Oppedahl & Larson

[57] ABSTRACT

A litter box which cleans itself automatically, and separates the soiled litter from the clean litter, storing the soiled litter in a receptacle and replacing the consumed litter by clean reserve litter. The litter box is formed from a sieve (1) configured as an endless web, a continous transport belt (8) for taking up litter to be recycled. The belt (8) circulates in a housing (5, 7, 9, 11). The litter box optionally includes a system (6, 15, 16, 18) comprising a bin bag facilitating the filling of the receptacle 21 even in a substantially horizontal positon. The litter box is useful with eats and other animals, particularly pets, farm animals or wild animals in captivity.

14 Claims, 3 Drawing Sheets

5,749,318

SELF-CLEANING LITTER BOX FOR ANIMALS

This application is a continuation of International Application No. PCT/FR/00988 filed Aug. 5, 1994, designating the United States.

BACKGROUND OF THE INVENTION

The present invention concerns a litter box for animals. More particularly, it concerns a self-cleaning litter box for domestic animals.

At the present time, sorting of soiled litter is rarely performed by persons caring for the domestic animal responsible for such soiling. Once soiled, almost all the litter is more often than not thrown out; or else, sorting the soiled litter out from the litter that is still usable is done manually by such persons with the aid of a more or less suitable scoop. Cleaning of the litter box and renewal of the litter likewise are very frequent manual operations, which are perceived as drudgery.

Alternatives to these procedures have been proposed in commerce and in published sources, notably published patent applications. According to some of these, the proposed means seek to eliminate the litter, but do not respect the cat's natural instinct; they then consist of a disposable absorbent mat (see document FR-A-2602643). Other published sources describe attempts to eliminate cleaning of the box thanks to disposable boxes or box bottoms (see document FR-A-2618050). But these attempts do not permit any saving of litter or of consumable materials and do not provide any solution to the concern for autonomy of the box. Other published sources propose means for automating the removal and replacement of all used litter with clean litter (see document FR-A-2648313), but these prior means offer no saving of litter and require the purchase of specific consumable materials. Other published sources propose in addition separating the solid waste from the used litter in order to reuse, after human intervention, the moist litter mixed with dry litter (see document U.S. Pat. No. 4,465,018). But they propose no solution to the concern for hygiene.

Thus, there was a need to make maintenance and renewal of the litter of domestic and similar animals as little trouble as possible.

SUMMARY OF THE INVENTION

It has now unexpectedly been found that this objective, as well as others which will appear in the light of the explanations that follow, may be accomplished by employing a device constituting a litter box wherein sorting and renewal of clean and dry litter are automatic or semi-automatic. Notably, there have been developed a process and a device making it possible to remedy this over-consumption of litter, as well as the lack of hygiene and of autonomy of existing devices.

The device according to the invention has the additional advantage of ensuring, in sequential or simultaneous fashion, automatic cleaning of the bottom of the box, sorting and removal of soiled litter and of the latter only, as well as recycling and conveyance of recovered clean litter to a reloadable reserve designed to maintain a virtually constant level of litter.

DETAILED DESCRIPTION OF THE INVENTION

The first subject matter of the present invention is a device constituting a litter box for animals, comprising a combination of:

a reserve of clean and/or recycled litter, optionally comprising:
   a double wall promoting priority utilization of sorted litter over new litter, as well as its distribution over the entire width of the box for a low dead volume, and/or
   an overflow avoiding blockage of the return system in case of excessive filling of the reserve;

a flexible screen, arranged to be capable of traveling like a conveyor screen on a fixed bottom;

a fixed bottom, on which the flexible screen travels and which constitutes the bottom of the receptacle for the animal;

a receptacle for excrement and soiled matter, preferably equipped to hold a trash bag and providing for discharge of waste into the latter with the aid of a pusher;

a continuous conveying member, such as a chain or a belt, moved, for example, by a driving pinion, traveling in a tubular enclosure comprising successively:
   a zone for sorting and recovery of clean sorted litter, advantageously in gutter form,
   a zone for return of litter,
   a zone for distribution of litter into the reserve,
   a zone for return of the chain to the sorting zone; as well as advantageously, as an option, a removable bottom protecting the receptacle for excrement and soiled matter or the trash bag and forming a receptacle for waste which may have fallen outside the trash bag;

fixed or removable anti-scatter edges around the zone useful for the animal;

an anti-odor trap, designed to prevent the discharge of any possible odors emanating from the said receptacle for excrement and soiled matter;

an electrical or electronic system for detecting entry of the animal and duration of stay; and/or an electrical system providing for operation and/or autonomy of the box in case of failure of the main power supply.

For greater convenience, the invention is described below in detail with reference to litter boxes for cats, but it applies quite as well, by equivalence, to litter boxes designed for other animals, notably, for other domestic animals, for farm animals or for wild animals in captivity, provided that their litter is sortable by screening. The dimensions of the device may be adapted in each individual case, according to the animal's size and shape. More generally, the invention described here applies equally to every type of sorting of matter which may be deposited on a screen with a view to the elimination of polluted matter and of recycling of unpolluted matter recovered by means of sorting.

The invention will be understood better, with reference to the description which follows, from the advantageous forms of implementation likewise described below and from the accompanying drawings.

Figure 1:
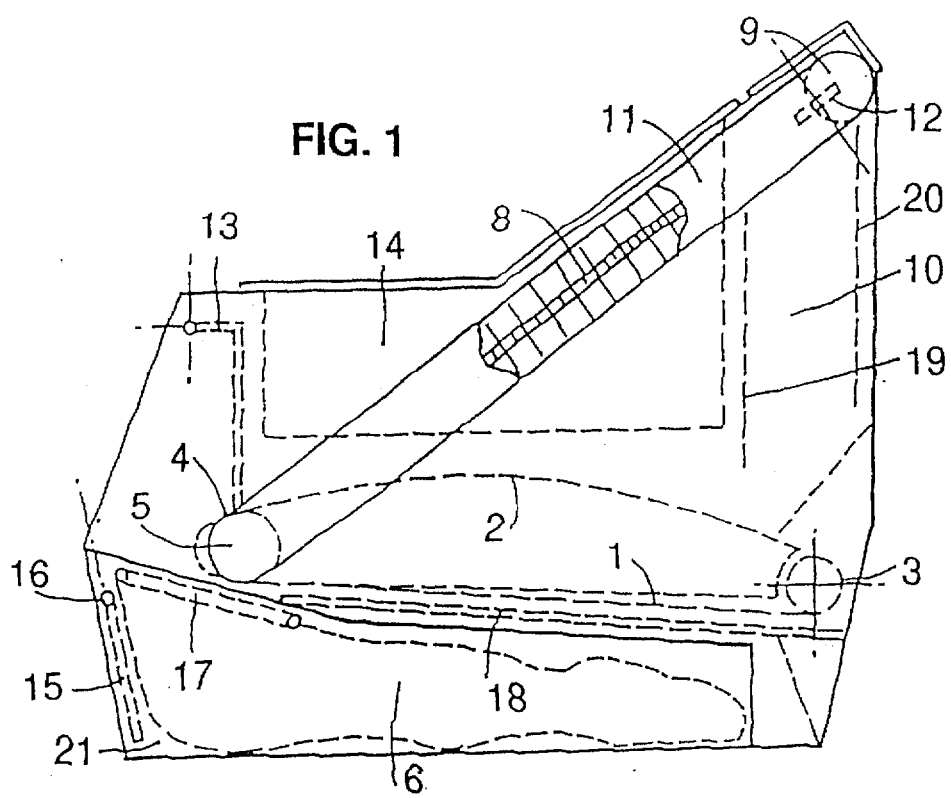
FIG. 1 shows a partial cross sectional view along a vertical plane of an embodiment of the litter box according to the invention.

As shown in FIG. 1, a preferred variant of the litter box of the invention comprises a flexible sized-mesh screen, mounted in the form of an endless belt (1) and carried along in rotation by a driving roller (3), advantageously toothed. The upper part of the screen is supported on a bottom (2), advantageously arched, forming a support for litter. Downstream in the direction of displacement of the screen (1), a sorting zone (4) projects from the bottom (2), above a gutter for the recovery of clean litter gutter. The soiled litter, agglomerated by the animal excrement, is separated from the clean litter and falls into the mouth of the receptacle for excrement and soiled matter (21).

Figure 2:
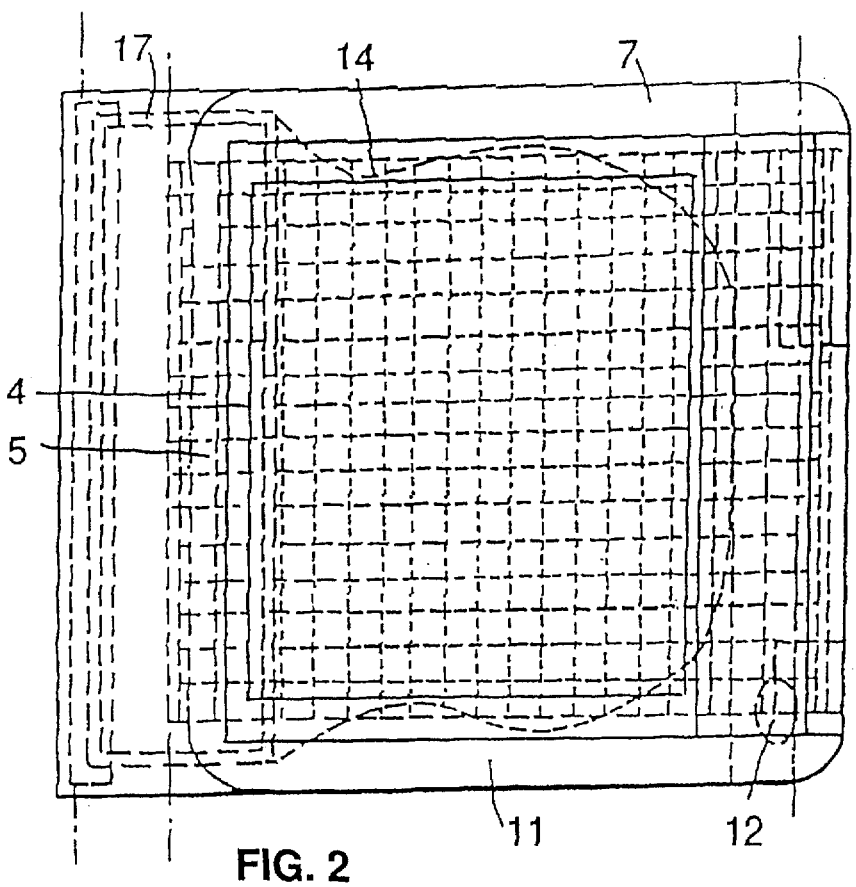
FIG. 2 shows a top view of such a device constituting a litter box according to the invention.
Figure 3:
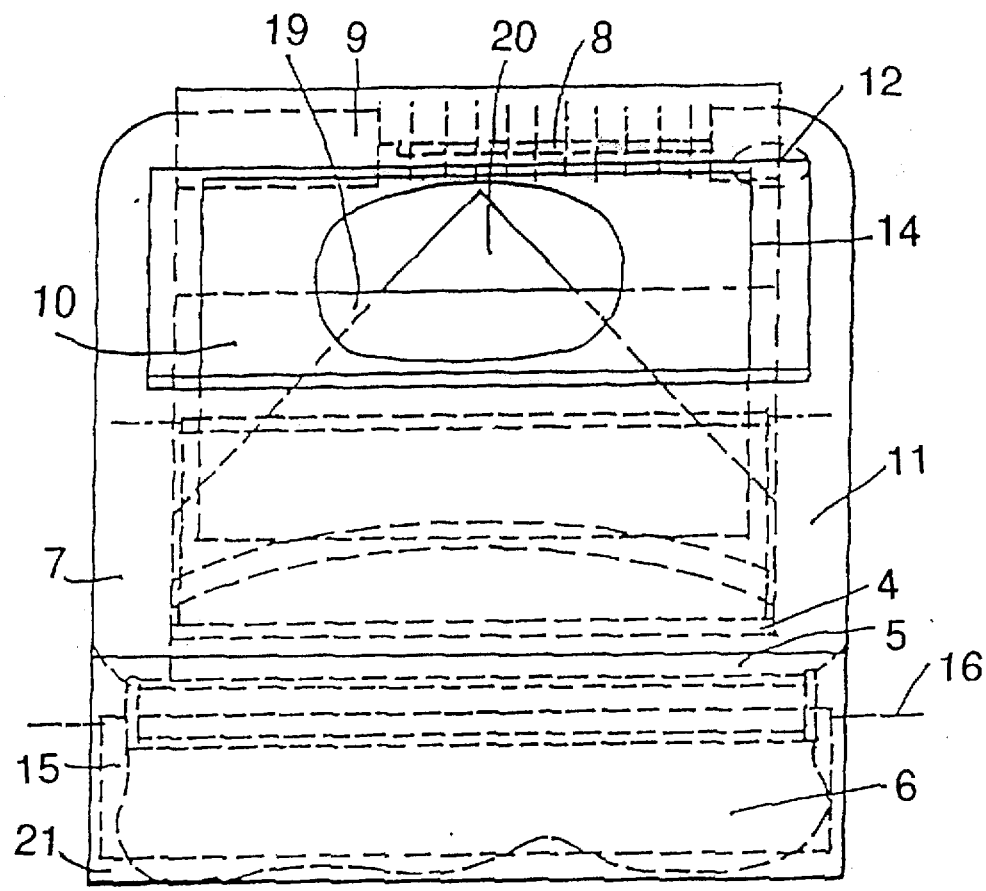
FIG. 3 shows a front view in partial schematic cross section of such a device constituting a litter box according to the invention.
Figure 4:
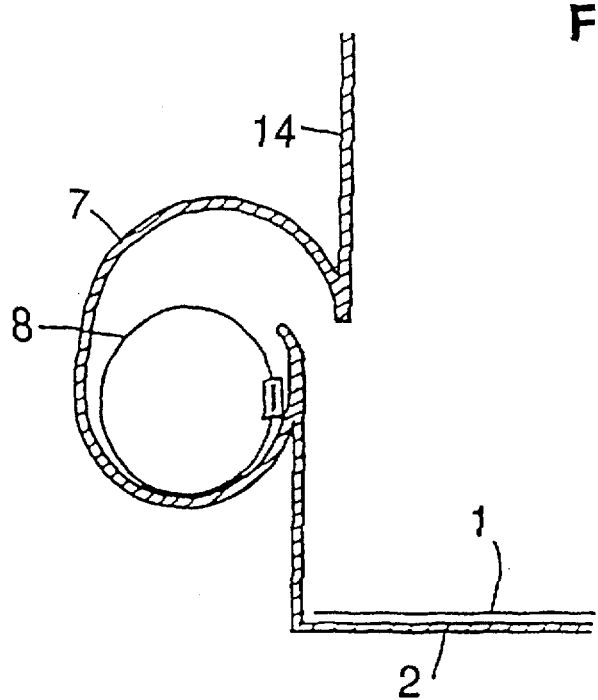
FIG. 4 shows a partial cross section of an embodiment of the anti-clogging return channel.
Figure 5:
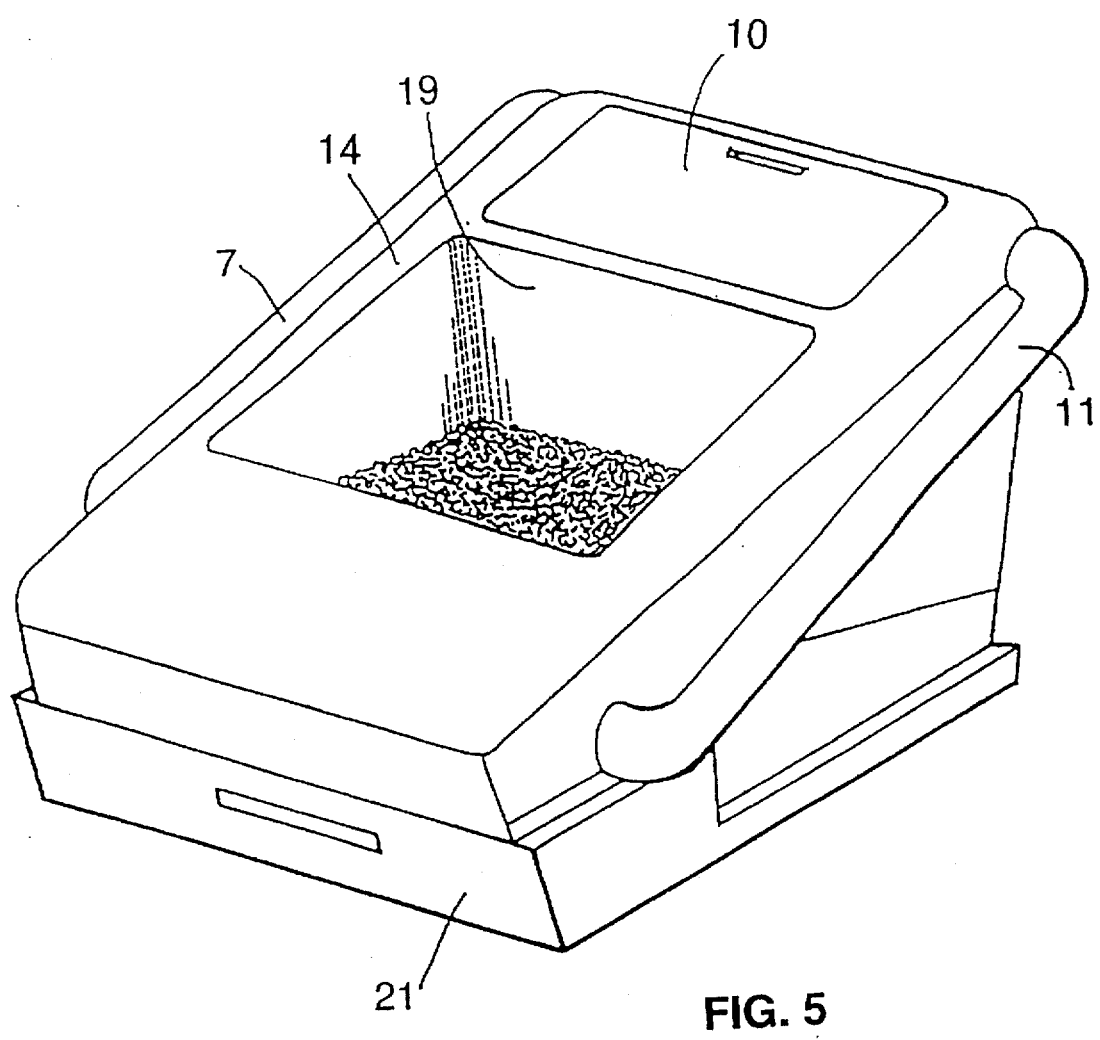
FIG. 5 represents, in isometric perspective, an embodiment of the litter box according to the invention.

The clean litter, once in the gutter (5), is sent to a reserve (10), via a return channel for clean litter return channel. (FIGS. 2–5) In this channel (7), advantageously constituted so as to form a channel (7) having a longitudinal opening adapted to have an anti-clogging function, (see FIG. 4), there preferably travels a conveyor chain or belt (8), the rings, fringes or hairs of which carry the litter along. The chain advantageously is driven by a toothed wheel or pulley (12) (see FIG. 2). The toothed wheel (12) is driven by a motor or some other electrical or mechanical member. The toothed wheel (12) acts on the chain (8) traveling in the channel (7,9,11) by way of a port arranged for this purpose in an appropriate high or low part, such as preferably an elbow of the channel. Thanks to interruption at (9) of the channel, the recycled clean litter is then discharged into the double wall of the reserve (20). The double wall (20) ensures, for a minimum dead volume, distribution of the litter over the entire width of the box, as well as priority passage of the recycled litter over the fresh litter. The chain (8) then returns to the sorting zone (4) through the above-mentioned channel part (11) (see FIG. 2), which brings it back into position of passage into the recovery gutter (5) for reconveyance of the clean litter to be recycled in accordance with the circuit indicated above.

An anti-odor trap (13) optionally may be installed, as a cover above the mouth of the soiled-litter compartment. The latter may be a simple removable drawer (21), which is adapted to receive a trash bag (6). Likewise as an option, fixed or removable edges (14) may be provided to avoid or limit the scattering of litter by the animal outside the enclosure of the box.

The reserve (10) is of course initially and then periodically filled or refilled with clean litter. This litter is distributed onto the screen (1) when the latter advances, in accordance with a variable depth adjustable with the aid of a distribution gauge (19).

In a preferred compact embodiment, such as, for example, that represented in FIG. 1 of the accompanying drawings, the receptacle is suitable for receiving a trash bag (6) arranged practically horizontally in a minimum volume below the lower surface of the endless belt forming the screen (1). Distribution of the waste collected into the trash bag (6) of the receptacle (21) is facilitated, if desired, by the addition of a pusher (15) to the device according to the invention. This pusher (15) pivots about an axis (16) and is arranged, for example, to be driven by an oscillating motion, the impulse of which is transmitted to the trash bag. Optionally, a removable bottom (18), equipped with a small receptacle, prevents the trash bag (6) from touching the screen and permits the particles of litter that have not fallen into the trash bag (6) to be collected. A hoop (17) preferably holds the throat of the trash bag open in suitable position.

In a version of the device according to the invention particularly suitable for a cat and for the various types of commercial litter designed for this animal, the litter box may have a useful surface area of about 26 cm in width and 34 cm in length, and the screen may have a mesh of about 12 mm square.

As concerns the principal components contributing to the effectiveness of the device of the invention, it should be noted that:

the screen advantageously is composed of crimped or welded wires or cables of stainless steel, or any other sufficiently flexible and strong material;

the chain returning the recycled litter is in practice composed of a mechanical chain or belt carrying coils or fringes scraping the bottom of channel parts (5,7). It may be composed preferably of a "Vaucanson" type chain strengthened with a long metal spring, for example, by welding, bonding and/or catching. It may alternatively be made, according to an advantageous variant, of a single piece of injection-molded plastic material constituting a toothed belt equipped with coils or fringes of a shape adapted to the section of the channel (5,7,9,11) for transport of the recycled litter;

in the variant according to which the receptacle contains a trash bag (6), the said bag may be held open by a hoop (17) fixed in a suitable position in the sliding receptacle forming a drawer (21), with a view to facilitating its placement and withdrawal;

the entire device may be driven manually by a mechanical device and/or electrically by suitable driving and transmission elements (not shown);

the other parts, notably those constituting the body of the device, the gutter and the anti-clogging channel, as well as the above-mentioned bottom and reserve, may be made of any material, preferably of thermoformed plastic material or of injection-molded plastic material.

The whole or an appropriate subassembly of the functional means composing the device according to the invention may be controlled by a system for detecting entry of the animal and duration of stay.

For such a litter box in automatic operation, entry of the animal into the box initiates a cycle of fixed duration for sorting of the soiled litter, for renewal of the consumed litter and for return of the clean litter and introduction into the receptacle of the soiled matter to be removed.

By way of non-limitative examples of means of putting this device into operation, there may be mentioned connection to the electrical circuit supplying the mechanism with alternating current, power supply by electric or rechargeable batteries, and power supply by solar cells conveniently arranged and oriented on the said litter box or in functional connection therewith.

The motor(s) may be electric motors of any type suitable for such use.

Operation of the device according to the invention alternatively may be completely or partially manual.

The litter may be of any kind and have a relatively fine particle size.

The size of the meshes of the screen may be adapted by a person skilled in the art to the type of litter concerned in each individual case. This adaptation is made on the basis of not only the particle size of the clean litter, but also of the size of the clumps formed by the soiled matter with the litter.

The device according to the present invention has a variety of advantages, which will be apparent to a person skilled in the art upon reading of the preceding description. The essential point is that the device is self-cleaning. Sorting permits the separation of litter from soiled matter and removal of only the latter. Introduction into a large-capacity trash bag of soiled matter from several successive uses is effected automatically. The clean litter recovered after sorting is automatically recycled to a reserve. The withdrawal of clean litter for keeping the litter at an appreciably constant level also takes place automatically several times in succession from the reserve of litter, which it is then sufficient to replenish at very infrequent intervals of time.

Likewise, a subject matter of the invention is a process for automatic or semi-automatic cleaning and resupply of litter for animals, comprising supply of fresh clean and/or recycled litter from a receptacle forming a box adapted to the animal, translation of the load of litter after deposit of excrement and/or of urine on the latter, sorting of the soiled portions of litter, selective collection in a receptacle of the fraction of soiled litter to be removed, recovery of the fraction of clean litter resulting from such sorting, conveyance to the supply reserve of this fraction of recovered clean litter, and collection and storage with a view to subsequent or later removal as waste of one or more fractions of soiled litter.

To facilitate reading of the accompanying drawings, the nomenclature of the elements of the device according to the invention is summarized below:
(1) sized-mesh screen in endless belt form;
(2) arched bottom capable of receiving the animal;
(3) driving roller driving the screen;
(4) sorting zone, at the end of the arched bottom;
(5) gutter for recovery of clean litter;
(6) trash bag;
(7) channel for return of clean litter;
(8) ringed conveyor chain;
(9) interruption of the anti-clogging channel in the reserve;
(10) reserve of clean litter supplying the screen;
(11) chain-return channel;
(12) toothed wheel driving the chain;
(13) anti-odor trap;
(14) anti-scatter edges;
(15) pusher for refill of the horizontally positioned trash bag;
(16) axis of rotation of the pusher;
(17) hoop for holding the trash bag open;
(18) removable bottom protecting the trash bag;
(19) distribution gauge;
(20) double wall of reserve;
(21) receptacle forming sliding drawer.

We claim:

1. A litter box for an animal, comprising
   a main receptacle for holding litter accessible to the animal, said first receptacle having a bottom;
   a reserve receptacle for holding clean, recycled litter or a combination there of, said reserve receptacle being connected to feed the litter to the main receptacle;
   a flexible screen for separating litter which is clumped together by excrement from the animal from unsoiled litter, said flexible screen being disposed against the bottom within the main receptacle and being movable along the bottom to transport litter within the main receptacle;
   means for collecting unsoiled litter transported by the flexible screen and recycling the unsoiled litter to the reserve receptacle; and
   a waste receptacle for receiving excrement and soiled matter transported by the flexible screen, said waste receptacle being disposed below the main receptacle.

2. The litter box according to claim 1, wherein the means for collecting and recycling comprises a continuous conveying member traveling in an enclosure comprising successively:
   a gutter for recovery of unsoiled litter which passes through the flexible screen,
   a zone for return of litter from the gutter to the reserve receptacle,
   a zone for distribution of litter into the reserve receptacle, and
   a zone for return of the conveying member to the gutter zone.

3. The litter box of claim 2, wherein the reserve receptacle has a double wall for promoting preferential use of sorted litter over new litter, as well as its distribution over the entire width of the box for a low dead volume.

4. The litter box of claim 3, wherein the reserve receptacle has an overflow for avoiding blockage of the zone for return of the conveying member in case of excessive filling of the reserve receptacle.

5. The litter box according to claim 1, further comprising a removable bottom member disposed between the bottom of the main receptacle and the waste receptacle.

6. The litter box according to claim 1, further comprising an anti-odor trap for reducing discharge of odors emanating from the waste receptacle.

7. The litter box according to claim 1, further comprising an electrical or electronic system for detecting entry of the animal into the main receptacle and duration of stay.

8. The litter box according to claim 1, further comprising an electrical system providing for operation or autonomy of the box in case of power failure.

9. The litter box according to claim 1, wherein the flexible screen has the form of an endless belt and is composed of crimped or welded wires or cables.

10. The litter box according to claim 1, wherein the conveying member is composed of a mechanical chain or belt having metal coils.

11. The litter box according to claim 10, wherein the waste receptacle is sized for receiving a trash bag arranged substantially horizontally below the endless belt forming the flexible screen, further comprising a pusher for facilitating distribution of collected excrement and soiled litter into the trash bag.

12. The litter box according to claim 11, further comprising a hoop for holding the throat of a trash bag in an open position for receiving excrement and soiled litter entering the waste receptacle.

13. The litter box according to claim 11, further comprising a sliding plate forming a drawer for facilitating placement and withdrawal of a bag within the waste receptacle.

14. A method for automatic or semi-automatic cleaning and resupply of litter for animals, comprising the steps of:
   supplying clean or recycled litter from a reserve receptacle to a main receptacle forming a box adapted in size for the animal,
   transporting the litter in the main receptacle to a sorting location within the main receptacle after deposit of excrement or of urine in the litter;
   separating excrement and soiled litter from unsoiled litter at the sorting location; and
   recycling unsoiled litter to the reserve receptacle while depositing excrement and soiled litter in a waste receptacle.

* * * * *